United States Patent
Wang et al.

(10) Patent No.: US 11,908,451 B2
(45) Date of Patent: Feb. 20, 2024

(54) TEXT-BASED VIRTUAL OBJECT ANIMATION GENERATION METHOD, APPARATUS, STORAGE MEDIUM, AND TERMINAL

(71) Applicants: MOFA (SHANGHAI) INFORMATION TECHNOLOGY CO., LTD., Shanghai (CN); SHANGHAI MOVU TECHNOLOGY CO., LTD., Shanghai (CN)

(72) Inventors: Congyi Wang, Shanghai (CN); Yu Chen, Shanghai (CN); Jinxiang Chai, Shanghai (CN)

(73) Assignees: Mofa (Shanghai) Information Technology Co., Ltd., Shanghai (CN); Shanghai Movu Technology Co., Ltd., Shanghai (CN)

( * ) Notice: Subject to any disclaimer, the term of this patent is extended or adjusted under 35 U.S.C. 154(b) by 0 days.

(21) Appl. No.: 18/024,021

(22) PCT Filed: Aug. 9, 2021

(86) PCT No.: PCT/CN2021/111424
§ 371 (c)(1),
(2) Date: Feb. 28, 2023

(87) PCT Pub. No.: WO2022/048405
PCT Pub. Date: Mar. 10, 2022

(65) Prior Publication Data
US 2023/0267916 A1  Aug. 24, 2023

(30) Foreign Application Priority Data
Sep. 1, 2020  (CN) .......................... 202010905539.7

(51) Int. Cl.
*G10L 13/10*  (2013.01)
*G06T 13/00*  (2011.01)
(Continued)

(52) U.S. Cl.
CPC .............. *G10L 13/10* (2013.01); *G06T 13/00* (2013.01); *G10L 13/033* (2013.01);
(Continued)

(58) Field of Classification Search
CPC ..... G10L 13/10; G10L 13/033; G10L 13/047; G10L 15/02; G10L 15/26;
(Continued)

(56) References Cited

U.S. PATENT DOCUMENTS 10,586,369 B1    3/2020  Roche et al.
10,770,092 B1 *  9/2020  Adams .................... G10L 21/18
(Continued)

FOREIGN PATENT DOCUMENTS

CN    105931631 A    9/2016
CN    106708789 A    5/2017
(Continued)

OTHER PUBLICATIONS

International Search Report dated Nov. 9, 2021, for Application No. PCT/CN2021/111424 (five (5) pages).
(Continued)

*Primary Examiner* — Said Broome
*Assistant Examiner* — Donna J. Ricks
(74) *Attorney, Agent, or Firm* — KDW Firm PLLC

(57) ABSTRACT

A text-based virtual object animation generation includes acquiring text information, where the text information includes an original text of a virtual object animation to be generated; analyzing an emotional feature of the text information; performing speech synthesis according to the emotional feature, a rhyme boundary, and the text information to
(Continued)

obtain audio information, where the audio information includes emotional speech obtained by conversion based on the original text; and generating a corresponding virtual object animation based on the text information and the audio information, where the virtual object animation is synchronized in time with the audio information.

17 Claims, 3 Drawing Sheets

(51) Int. Cl.
G10L 13/033 (2013.01)
G10L 13/047 (2013.01)
G10L 15/02 (2006.01)
G10L 15/26 (2006.01)

(52) U.S. Cl.
CPC ............ *G10L 13/047* (2013.01); *G10L 15/02* (2013.01); *G10L 15/26* (2013.01); *G10L 2013/105* (2013.01)

(58) Field of Classification Search
CPC ... G10L 2013/105; G10L 13/08; G10L 13/02; G06T 13/00; G06T 13/205; G06T 13/40; G06T 13/80; G06F 40/289; G06F 40/30; G06N 3/045; G06N 3/049; G06N 3/08; G06N 20/00
See application file for complete search history.

(56) References Cited

U.S. PATENT DOCUMENTS

| 2002/0194006 | A1 | 12/2002 | Challapali | |
|---|---|---|---|---|
| 2004/0111272 | A1* | 6/2004 | Gao | G06F 40/58 704/277 |
| 2010/0082345 | A1* | 4/2010 | Wang | G10L 13/00 704/E21.02 |
| 2012/0323581 | A1* | 12/2012 | Strietzel | G06T 19/20 704/276 |
| 2019/0095775 | A1* | 3/2019 | Lembersky | G06N 3/006 |
| 2021/0248804 | A1* | 8/2021 | Hussen Abdelaziz | G06T 13/80 |

FOREIGN PATENT DOCUMENTS

| CN | 107564511 A | 1/2018 |
|---|---|---|
| CN | 108597492 A | 9/2018 |
| CN | 110880198 A | 3/2020 |
| CN | 110941954 A | 3/2020 |
| CN | 111369971 A | 7/2020 |
| CN | 111402855 A | 7/2020 |
| CN | 112184858 A | 1/2021 |
| CN | 112184859 A | 1/2021 |

OTHER PUBLICATIONS

The First Office Action dated Jun. 17, 2021 for Chinese Patent Application No. 202010905539.7 (19 pages).

* cited by examiner

TEXT-BASED VIRTUAL OBJECT ANIMATION GENERATION METHOD, APPARATUS, STORAGE MEDIUM, AND TERMINAL

CROSS-REFERENCES TO RELATED APPLICATIONS

This application is a national stage application filed under 35 U.S.C. 371 based on International Patent Application No. PCT/CN2021/111424, filed on Aug. 9, 2021, which claims priority to Chinese Patent Application No. 202010905539.7 filed with the China National Intellectual Property Administration (CNIPA) on Sep. 1, 2020, the disclosures of which are incorporated herein by reference in their entireties.

TECHNICAL FIELD

The present disclosure relates to the field of virtual digital object technologies and, in particular, to a text-based virtual object animation generation method and apparatus, a storage medium, and a terminal.

BACKGROUND

With the rapid development of virtual digital object (referred to as virtual object) technologies, the animation industry, and other fields, the requirement of the market for rapid automatic generation of a realistic virtual image is increasing day by day. Specifically, a rapid generation system of a virtual object animation focuses on how to quickly and efficiently generate emotional speech and the corresponding virtual object animation from a text.

When the preceding data is produced by the traditional system, a professional sound recordist for dubbing and an artist for the corresponding virtual object expression production and body movement production are required. A significant investment in labor costs and time costs is required.

Moreover, such a production manner relies on a voice actor with specific voice characteristics, severely limiting the versatility of the technology and the further reduction of production costs. The artist needs to manually fix the movement of the actor, which is time-consuming.

SUMMARY

The technical problem solved by the present disclosure is how to quickly and efficiently generate a virtual object animation with emotional speech from a text.

To solve the preceding technical problem, an embodiment of the present disclosure provides a text-based virtual object animation generation method. The method includes acquiring text information, where the text information includes an original text of a virtual object animation to be generated; analyzing an emotional feature and a rhyme boundary of the text information; performing speech synthesis according to the emotional feature, the rhyme boundary, and the text information to obtain audio information, where the audio information includes emotional speech obtained by conversion based on the original text; and generating a corresponding virtual object animation based on the text information and the audio information, where the virtual object animation is synchronized in time with the audio information.

DETAILED DESCRIPTION

As stated in the BACKGROUND, the existing virtual object animation generation technology have to rely on the drive of a specific articulator and is poorly versatile. Moreover, the production process requires human support from artists and has high labor costs and time costs.

To solve the preceding technical problem, an embodiment of the present disclosure provides a text-based virtual object animation generation method. The method includes acquiring text information, where the text information includes an original text of a virtual object animation to be generated; analyzing an emotional feature and a rhyme boundary of the text information; performing speech synthesis according to the emotional feature, the rhyme boundary, and the text information to obtain audio information, where the audio information includes emotional speech obtained by conversion based on the original text; and generating a corresponding virtual object animation based on the text information and the audio information, where the virtual object animation is synchronized in time with the audio information.

In the solution, the virtual object animation, especially a 3D animation, with emotional speech can be quickly and efficiently generated from a text, which has high versatility and does not need the drive of a specific voice actor. Specifically, the emotional speech is synthesized by analyzing the emotional feature and the rhyme boundary of the text. Further, the corresponding virtual object animation is generated based on the text and the emotional speech. Further, data of the generated virtual object animation in the temporal sequence is synchronized in time with the audio information, making it possible to generate the virtual object animation directly from the text, and the generated virtual object animation can be synchronized with the emotional speech when acting in the temporal sequence.

The objective, feature, and beneficial effect of the present disclosure are more apparent from the detailed description of embodiments of the present disclosure in conjunction with the drawings.

Figure 1:
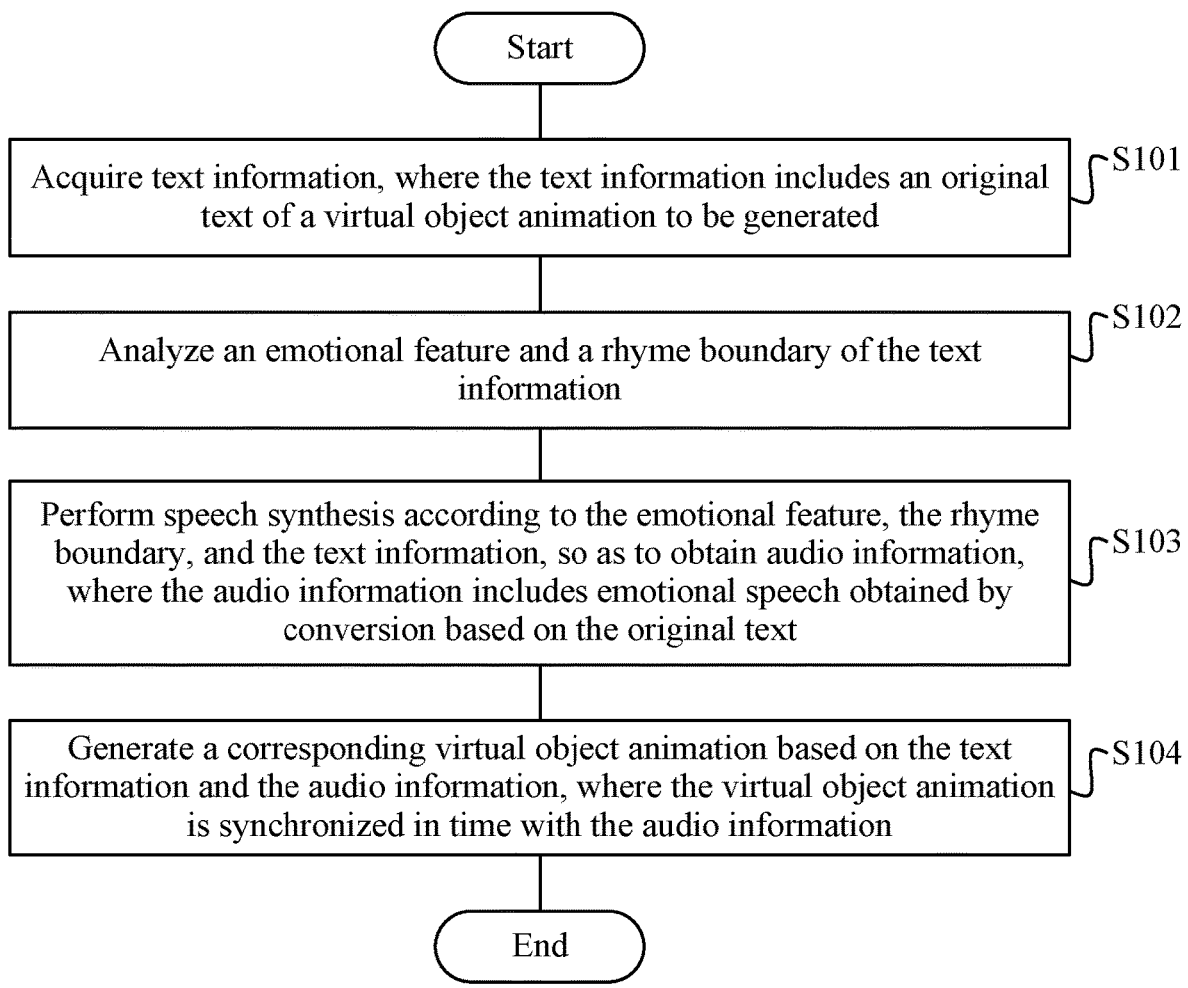
FIG. 1 is a flowchart of a text-based virtual object animation generation method according to an embodiment of the present disclosure.

FIG. 1 is a flowchart of a text-based virtual object animation generation method according to an embodiment of the present disclosure.

The embodiment of this embodiment can be applied to application scenarios such as virtual digital object generation and animation production.

Virtual objects may include virtual people, virtual animals, virtual plants, and other multiple types of virtual objects, such as a virtual digital human voice assistant, a virtual teacher, a virtual consultant, and a virtual newsreader. The virtual objects may be three-dimensional or two-dimensional.

The text-based virtual object animation generation method described in the solution may be understood as an end-to-end virtual object animation generation solution. A user simply provides an original text and inputs the original text into the computer executing the embodiment, so as to generate the corresponding virtual object animation and the emotional speech in synchronization with the corresponding virtual object animation.

For example, the user inputs the original text into the computer executing the solution, so as to generate the corresponding 3D virtual object animation and the emotional speech in synchronization with the corresponding 3D virtual object animation. A virtual object image may be set according to the actual situation, including a 3D virtual object and a two-dimensional (2D) virtual object.

The end-to-end may mean that the computer operation covers the achievement from an input end to an output end, and there is no human (for example, an animator) intervention between the input end and the output end. The input end refers to a port for receiving the original audio and original text, and the output end refers to a port for generating and outputting the virtual object animation.

The virtual object animation outputted from the output end may include a controller for generating the virtual object animation, specifically in the form of a sequence of digitized vectors. For example, the virtual object animation may include lip animation, the controller of the lip animation outputted from the output end may include offset information of lip feature points, and the controller of the lip animation is inputted into a rendering engine so as to drive the lip of the virtual object to make corresponding actions.

That is to say, the controller for generating the virtual object animation may be a sequence of virtual object animation data, and the data in the sequence is arranged in the temporal sequence of input information and synchronized with audio data generated based on the input information. The virtual object animation data may be used for driving the facial expression motion and human posture motion of the virtual object. The final virtual object animation may be obtained through the rendering engine.

The virtual object animation data may include the facial expression action data and body action data of the virtual object. The facial expression action includes information such as the expression, eye, and lip shape, and the body action may include information such as the human posture and gesture of the virtual object. In this embodiment, the facial expression action data is referred to as an expression parameter of the virtual object and the body action data is referred to as an action parameter of the virtual object.

Specifically, referring to FIG. 1, the text-based virtual object animation generation method described in this embodiment may include the steps described below.

In step S101, text information is acquired, where the text information includes an original text of a virtual object animation to be generated.

In step S102, an emotional feature and a rhyme boundary of the text information are analyzed.

In step S103, speech synthesis is performed according to the emotional feature, the rhyme boundary, and the text information, so as to obtain audio information, where the audio information includes emotional speech obtained by conversion based on the original text.

In step S104, a corresponding virtual object animation is generated based on the text information and the audio information, where the virtual object animation is synchronized in time with the audio information.

In a specific implementation, the text information may be acquired from a user side where the virtual object animation needs to be generated.

Specifically, the original text may be a single sentence or a paragraph including multiple sentences.

Further, the original text may include common characters such as Chinese characters, English characters, numbers, and special characters.

In a specific implementation, the text information may be obtained based on the real-time input from a device such as a keyboard. Alternatively, the input information may be the text information pre-collected and transmitted in a wired or wireless manner to a computing device executing the solution of this embodiment when the corresponding virtual object animation needs to be generated.

In a specific implementation, after step S101 and before step S102, the virtual object animation generation method of this embodiment may further include the step of normalizing the text information according to a contextual background to obtain the normalized text information.

Specifically, the normalization processing may include numeric reading processing and special character reading processing.

Through the numeric reading processing, the correct reading of a number in the original text may be determined according to a rule matching method. For example, the number "110" may be read as "one hundred and ten" or "one one zero"; then when the numeric reading processing is performed on the number "110", the correct reading of the number "110" may be determined according to the contextual background before and after the number "110". For another example, the number "1983" may be read as "one nine eight three" or "one thousand nine hundred and eighty-three"; assuming that the following text content of the number "1983" in the original text is "year", it may be determined that the correct reading of the number "1983" here is "one nine eight three".

Through the special character reading processing, the correct reading of a specific character in the original text can be determined according to the rule matching. A reading dictionary for special characters may be constructed in advance so as to perform the special character reading processing on the special character in the original text. For example, the special character "¥" is an RMB symbol and may be directly read as "yuan".

The normalization processing may include reading processing of a polyphonic word for determining the correct reading of the polyphonic word according to the contextual background.

Further, the normalized text information may be used as a data processing base in steps S102 to S104.

In a specific implementation, step S102 may include the steps of performing word segmenting processing on the text information; performing an emotion analysis on each word obtained by the word segmenting to obtain the emotional feature of the each word; and determining the rhyme boundary of the each word.

Specifically, the word segmenting processing may be performed on the normalized text information based on natural language processing so as to obtain a word in the smallest unit. For example, the word in the smallest unit may be a single word or may be a phrase or idiom capable of characterizing a specific meaning.

Further, the emotional feature of each word obtained by the word segmenting processing is determined so as to obtain the emotional feature of the normalized text information.

Further, the analysis of the emotional feature and the estimation of the rhyme boundary for each word may be combined with the words located before and after the each word for combined analysis and estimation.

In a specific implementation, step S102 may be performed based on a preset text front-end prediction model, where the preset text front-end prediction model may include a recurrent neural network (RNN) and conditional random fields (CRF) that are coupled. An input of the preset text front-end prediction model is the text information, and an output of the preset text front-end prediction model is the emotional feature, the rhyme boundary, and the word segmenting of the text information.

That is to say, in this specific implementation, a deep learning model of RNN+CRF is used to quickly predict emotional features of words of the text information and estimate rhyme boundaries.

It is to be noted that the preset text front-end prediction model may simultaneously output the emotional feature, the rhyme boundary, and a word segmenting result of the text information. Within the preset text front-end prediction model, according to the specific process of step S102 in the preceding specific implementation, the word segmenting is performed and then the word segmenting result is processed so as to obtain the corresponding emotional feature and rhyme boundary.

In a specific implementation, step S103 may include the steps of inputting the text information, the emotional feature, and the rhyme boundary into a preset speech synthesis model, where the preset speech synthesis model is used for converting an inputted text sequence into a speech sequence in a temporal sequence based on deep learning, and speech in the speech sequence carries emotion of the text at a corresponding point in time; and acquiring the audio information outputted by the preset speech synthesis model.

Specifically, the emotion of the text at the corresponding point in time may include the emotional feature and the rhyme boundary of the text.

Compared with the existing speech synthesis solution that speech synthesis is performed based only on the original text, in this specific implementation, the original text and the emotional feature and the rhyme boundary of the original text are used as the input, and the emotional speech is obtained by conversion based on the preset speech synthesis model.

Further, the preset speech synthesis model may be a Sequence to Sequence (Seq-to-Seq) model.

For example, during speech synthesis, for each word obtained by the word segmenting in step S102, the corresponding speech may be determined based on the text, emotional feature, and rhyme boundary of the each word. All words of the text information are arranged in the temporal sequence and go through the speech synthesis model, so as to obtain the corresponding speech sequence with emotion, and the speech sequence with emotion is also in the temporal sequence, and the speech sequence is synchronized with the text sequence.

Further, the preset speech synthesis model may operate in real time or offline. Real-time operation is that the text information generated in real time and the emotional feature and rhyme boundary obtained from the prediction of the text information are inputted while the corresponding emotional speech is synthesized, such as a live streaming scenario of the virtual object animation. Offline operation refers to the complete text information and the emotional feature and rhyme boundary obtained from the prediction of the text information are inputted and the corresponding emotional speech is synthesized, such as the offline animation creation scenario.

From the above, the text can be accurately and quickly converted into high-quality emotional speech based on the preset speech synthesis model.

In a specific implementation, the preset speech synthesis model is trained based on training data, where the training data may include a text information sample and a corresponding audio information sample, where the audio information sample is pre-recorded according to the text information sample.

For example, the audio information sample may be recorded by the professional sound recordist in a recording studio according to the text information sample.

Further, according to the textual context of the text information sample, the emotional feature, the rhyme boundary, and the word segmenting in the recorded audio information sample may be determined. The emotional feature determined according to the audio information sample in conjunction with the textual context is denoted as a standard emotional feature of the text information sample.

The speech is emotional when recorded, but the text is emotionless. Therefore, to ensure the synthesis of controllable emotional speech, information such as the emotional information and rhyme boundary needs to be added to the inputted text information during synthesis. Therefore, during a training stage of the preset text front-end prediction model, it needs to be ensured that the emotional feature (denoted as a predicted emotional feature) predicted by the preset text front-end prediction model matches the standard emotional feature determined during speech recording.

Correspondingly, when the preset text front-end prediction model is trained, the predicted emotional feature outputted by the preset text front-end prediction model may be compared with the standard emotional feature, thereby adjusting a model parameter of the preset text front-end prediction model.

Specifically, a training process of the preset text front-end prediction model may be performed iteratively, that is, the parameter is adjusted constantly according to the difference between the predicted emotional feature and the standard emotional feature so that the predicted emotional feature outputted by the preset text front-end prediction model gradually approaches the standard emotional feature.

Further, audio sample information may be the emotional speech. The recorded audio sample information may carry the corresponding emotional color according to the scenario of the text information.

In a specific implementation, the training data may further include an extended sample, where the extended sample may be obtained by performing audio text slicing recombination on the text information sample and the corresponding audio information sample.

Specifically, the audio text slicing recombination may mean that the audio information sample and the text information sample are separately sliced into minimum units and then the minimum units are arranged and combined. Therefore, the expansion of sample data and data augmentation can be achieved, which is conducive to the training of the deep learning model with a strong generalization capability.

Further, slicing may be performed according to the emotional feature and the rhyme boundary so as to obtain the minimum units.

For example, the text A: I am from the coast, which corresponds to the speech As and is denoted as A<"I am from the coast", As> has been recorded as the training data, and the text B: He is from Chongqing, which corresponds to the speech Bs and is denoted as B<"He is from Chongqing", Bs> has been also recorded as the training data. It is assumed that A may be sliced into "I am from" and "the coast", which are denoted as $A_1<$"I am from", $As_1>$ and $A_2<$"the coast", $As_2>$. It is assumed that B may be sliced into "He is from" and "Chongqing", which are denoted as $B_1<$"He is from", $Bs_1>$ and $B_2<$"Chongqing", $Bs_2>$.

Then the above may be recombined as $A_1B_2<$"I am from Chongqing", $As_1Bs_2>$ and $B_1A_2<$"He is from the coast", $Bs_1As_2>$.

The preceding audio text slicing recombination should be in accordance with the actual language usage habit, for example, in an order of the subject, the predicate, and the object, rather than being a combination of arbitrary orders.

In a specific implementation, step S104 may include the step of inputting the text information and the audio information into a preset temporal sequence mapping model to generate the corresponding virtual object animation.

Specifically, the preset temporal sequence mapping model may be used for mapping the inputted feature sequence to an expression parameter and/or action parameter of a virtual object in a temporal sequence to generate the corresponding virtual object animation.

Further, in step S104, the text information, the emotional feature and the rhyme boundary of the text information, and the audio information may be inputted together into the preset temporal sequence mapping model so as to generate the corresponding virtual object animation.

Next, the case where the virtual object animation is generated based on the linguistic feature analysis is used as an example for detailed description.

Figure 2:
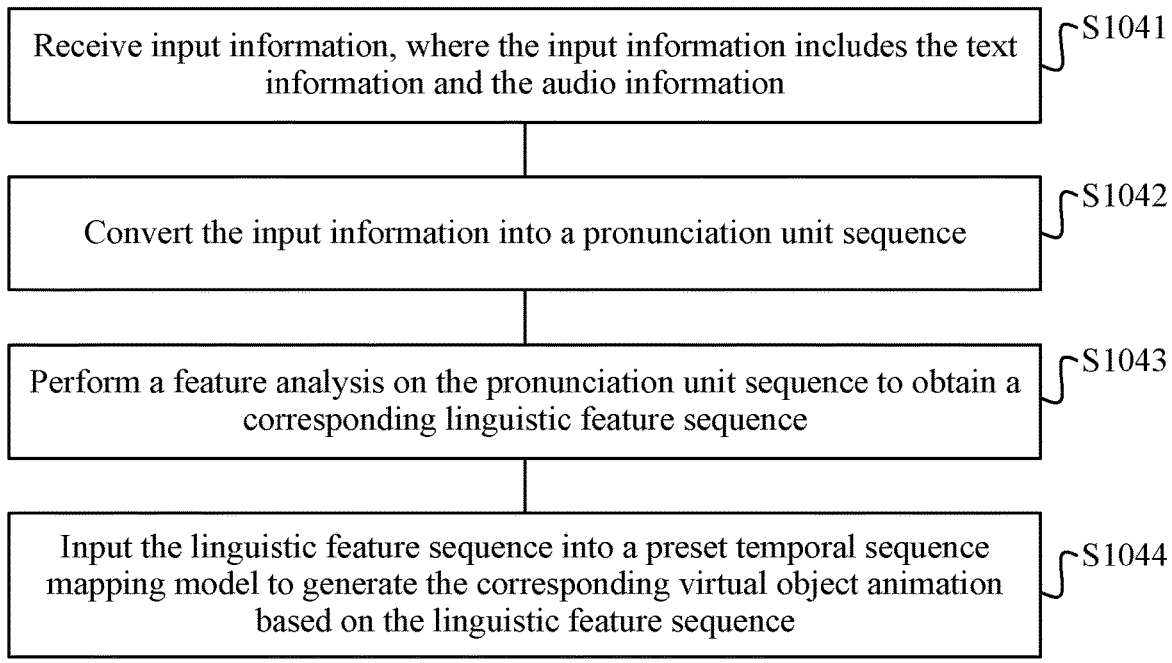
FIG. 2 is a flowchart of an embodiment of step S104 in FIG. 1.

In a specific implementation, referring to FIG. 2, step S104 may include the steps described below.

In step S1041, input information is received, where the input information includes the text information and the audio information.

In step S1042, the input information is converted into a pronunciation unit sequence.

In step S1043, a feature analysis is performed on the pronunciation unit sequence so as to obtain a corresponding linguistic feature sequence.

In step S1044, the linguistic feature sequence is inputted into a preset temporal sequence mapping model so as to generate the corresponding virtual object animation based on the linguistic feature sequence.

Specifically, in this specific implementation, the preset temporal sequence mapping model may be applied to the end-to-end virtual object animation generation scenario with multimodal inputs and an arbitrary articulator. The multimodal inputs may include a speech input and a text input. The arbitrary articulator may mean that there is no limitation on the audio feature of the articulator.

More specifically, the linguistic feature sequence may include multiple linguistic features, where each linguistic feature includes at least a pronunciation feature of the corresponding pronunciation unit.

Further, the preset temporal sequence mapping model may be used for mapping the inputted linguistic feature sequence to the expression parameter and/or action parameter of the virtual object in the temporal sequence based on the deep learning to generate the corresponding virtual object animation.

Further, the pronunciation unit sequence and the linguistic feature sequence are both time-aligned sequences.

In a specific implementation, the input information may be divided into the pronunciation unit sequence that consists of minimum pronunciation units and serves as a data base for subsequent linguistic feature analysis.

Specifically, step S1042 may include the steps of converting the input information into pronunciation units and corresponding time codes; and performing a time alignment operation on the pronunciation units according to the time codes to obtain the time-aligned pronunciation unit sequence. For ease of description, in this embodiment, the time-aligned pronunciation unit sequence is abbreviated as the pronunciation unit sequence.

A single pronunciation unit and the corresponding time code are recorded as a set of data. Step S102 is performed so that multiple sets of data may be obtained by conversion from the input information, where each set of data includes a single pronunciation unit and the corresponding time code. The pronunciation units in multiple sets of data are aligned in the temporal sequence through the time codes so as to obtain the time-aligned pronunciation unit sequence.

In the case where the input information is the audio information, the audio information may be converted into the text information and then the text information may be processed so as to obtain the pronunciation units and the corresponding time codes.

In the case where the input information is the text information, the text information may be processed directly so as to obtain the pronunciation units and the corresponding time codes.

Further, the text information may be in the form of textual expressions such as the word, character, phonetic transcription, and phoneme.

In the case where the input information is the audio information, the audio information may be converted into the pronunciation units and the corresponding time codes based on the automatic speech recognition (ASR) technology and a preset pronunciation dictionary.

In the case where the input information is the text information, basic pronunciation units in the text information and the alignment and duration information in the time dimension may be extracted based on a front-end module and an alignment module in the text-to-speech (TTS) technology, thereby obtaining the time-aligned basic pronunciation unit sequence.

When the input information is the text message and the audio information, the text information may serve as a guide for determining the duration of each piece of speech in the audio information.

That is to say, in step S1042, in the case where the input information is the audio information, the audio information may be converted into the pronunciation units and the corresponding time codes based on the speech recognition technology and the preset pronunciation dictionary, and then the time alignment operation is performed on the pronunciation units according to the time codes so as to obtain the time-aligned pronunciation unit sequence.

In the case where the input information is the text information, the text information may be converted into the pronunciation units and the corresponding time codes based on the speech synthesis technology, and then the time alignment operation is performed on the pronunciation units according to the time codes so as to obtain the time-aligned pronunciation unit sequence.

The case where the pronunciation units are phonemes is used as an example. In the case where the input information is the audio information, the corresponding phoneme sequence and the duration information of each phoneme may be extracted from the original audio based on the speech recognition technology and a pre-defined pronunciation dictionary.

For another example, in the case where the input information is the text information, the non-time-aligned phoneme sequence in the original text and an alignment matrix of phonemes and an output audio Mel spectrogram may be obtained based on the front-end module and an attention-based alignment module in the TTS technology. Then the phoneme corresponding to each time segment may be obtained based on a dynamic planning algorithm so as to obtain the time-aligned phoneme sequence.

In a specific implementation, after the time-aligned pronunciation unit sequence is obtained, to further improve the generalization capability of the preset temporal sequence mapping model, step S1043 may be performed so as to perform the linguistic feature analysis on the basic pronunciation unit sequence obtained in step S1042 and obtain the time-aligned linguistic feature sequence (which may be abbreviated as the linguistic feature sequence).

Figure 3:
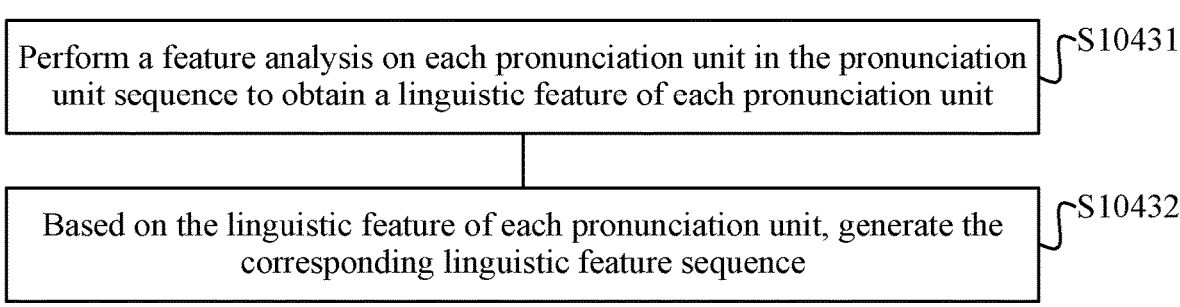
FIG. 3 is a flowchart of an embodiment of step S1043 in FIG. 2.

Specifically, referring to FIG. 3, step S1043 may include the steps described below.

In step S10431, a feature analysis is performed on each pronunciation unit in the pronunciation unit sequence so as to obtain a linguistic feature of each pronunciation unit.

In step S10432, based on the linguistic feature of each pronunciation unit, the corresponding linguistic feature sequence is generated.

More specifically, the linguistic feature may be used for characterizing the pronunciation feature of the pronunciation unit. For example, the pronunciation feature includes, but is not limited to, whether the pronunciation unit is the front or back nasal sound, whether the pronunciation unit is a monophthong or diphthong, whether the pronunciation unit is the aspirated or unaspirated sound, whether the pronunciation unit is the fricative, and whether the pronunciation unit is the apical.

In a specific implementation, the linguistic feature of the pronunciation unit may include an independent linguistic feature obtained through a feature analysis of the single pronunciation unit.

Specifically, step S10431 may include the step of analyzing the pronunciation feature of each pronunciation unit to obtain an independent linguistic feature of the pronunciation unit; and generating the linguistic feature of the pronunciation unit based on the independent linguistic feature of the pronunciation unit.

More specifically, the independent linguistic feature may be used for characterizing the pronunciation feature of the single pronunciation unit.

The case where the pronunciation units are phonemes is used as an example. The feature analysis may be performed on each phoneme in the time-aligned phoneme sequence obtained in step S1042, so as to obtain the pronunciation feature of the phoneme.

The pronunciation feature to be analyzed for each phoneme may include {whether the phoneme is the nasal sound; whether the phoneme is the front nasal sound; whether the phoneme is the back nasal sound; whether the phoneme is a monophthong; whether the phoneme is a diphthong; whether the phoneme is the aspirated sound; whether the phoneme is the fricative; whether the phoneme is the unvoiced sound; whether the phoneme is the voiced sound; whether the phoneme is the labial; whether the phoneme is the apical; whether the phoneme is the front apical; whether the phoneme is the back apical; whether the phoneme is the cacuminal; whether the phoneme is the blade-alveolar; whether the phoneme is a vowel containing A; whether the phoneme is a vowel containing E; whether the phoneme is a vowel containing I; whether the phoneme is a vowel containing O; whether the phoneme is a vowel containing U; whether the phoneme is a vowel containing V; whether the phoneme is the plosive; whether the phoneme is a silent note; whether the phoneme is an initial consonant; and whether the phoneme is a simple or compound vowel}.

For each phoneme, answers to all the preceding questions are determined with 0 for "no" and 1 for "yes", thereby generating the independent linguistic feature of each phoneme in the form of a quantified code.

In a specific implementation, taking into account the synergistic pronunciation and the coherence of the generated animation, a single pronunciation unit being adjacent to pronunciation units with different pronunciation features in the temporal sequence may affect a pronunciation feature of an action feature of the animation corresponding to the current pronunciation unit. Therefore, step S10431 may further include the steps of analyzing the pronunciation feature of each pronunciation unit to obtain the independent linguistic feature of the pronunciation unit; analyzing the pronunciation features of pronunciation units adjacent to the pronunciation unit to obtain an adjacent linguistic feature of the pronunciation unit; and generating the linguistic feature of the pronunciation unit based on the independent linguistic feature and the adjacent linguistic feature of the pronunciation unit.

Specifically, all adjacent pronunciation units of each pronunciation unit may be analyzed within a certain time window, where the analytic dimension includes, but is not limited to, the number of vowels or consonants in a left window of the current pronunciation unit, the number of pieces of front or back nasal sound in a right window of the current pronunciation unit, and the like.

For example, the types of the pronunciation features of the adjacent pronunciation units and the number of the same type of pronunciation features are counted, and the adjacent linguistic feature is obtained according to the statistical results.

Further, the quantified statistical feature may be used as the adjacent linguistic feature of the current pronunciation unit.

Further, the adjacent pronunciation units of the pronunciation unit may include the preset number of pronunciation units centered on the pronunciation unit and located in front of and behind the pronunciation unit in the temporal sequence.

The specific value of the preset number may be determined according to experiments, for example, according to an evaluation indicator during training of the preset temporal sequence mapping model.

The statistical feature on the right side of the pronunciation unit located at the end of a sentence is uniformly zeroed.

The statistical feature on the left side of the pronunciation unit located at the beginning of a sentence is uniformly zeroed.

The case where the pronunciation units are phonemes is used as an example. For each phoneme in the time-aligned phoneme sequence obtained in step S1042, 20 consecutive phonemes may be taken from each of the left and right sides with the current phoneme as the center, and the pronunciation features of all the phonemes are counted.

The statistical dimensions of the pronunciation features of the 20 phonemes located on each of the left and right sides of the current phoneme may include {how many vowels are there on the left side of the central pronunciation unit; how many consonants are there on the left side of the central pronunciation unit; how many vowels are there on the right side of the central pronunciation unit; how many consonants are there on the right side of the central pronunciation unit; how many adjacent vowels are there on the left side of the central pronunciation unit; how many adjacent consonants are there on the left side of the central pronunciation unit; how many adjacent vowels are there on the right side of the central pronunciation unit; how many adjacent consonants are there on the right side of the central pronunciation unit; how many adjacent pieces of front nasal sound are there on the left side of the central pronunciation unit; how many adjacent pieces of back nasal sound are there on the left side of the central pronunciation unit; how many adjacent pieces of front nasal sound are there on the right side of the central pronunciation unit; and how many adjacent pieces of back nasal sound are there on the right side of the central pronunciation unit}.

Based on the preceding statistical dimensions, all adjacent phonemes of each phoneme are analyzed, and the quantified statistical feature is used as the adjacent linguistic feature of the current phoneme.

Further, for each pronunciation unit, the independent linguistic feature and the adjacent linguistic feature of the pronunciation unit are combined so as to obtain the complete linguistic feature of the pronunciation unit.

For example, the independent linguistic feature and the adjacent linguistic feature that are represented in a quantified coding form may be spliced end-to-end so as to obtain the linguistic feature of the pronunciation unit. That is, the linguistic feature of the pronunciation unit is a long array consisting of a series of quantified values.

In a specific implementation, in step S10432, the linguistic features of the pronunciation units arranged in the temporal sequence are spliced together in sequence so as to obtain a quantified linguistic feature sequence. The linguistic feature sequence is a feature quantitative expression of the input information, and the expression is not constrained by a specific articulator and does not need to be driven by a specific articulator.

Further, after the quantified linguistic feature sequence is obtained, step S1044 may be performed so as to input the linguistic feature sequence into the learned preset temporal sequence mapping model and obtain the corresponding virtual object animation data sequence.

Figure 4:
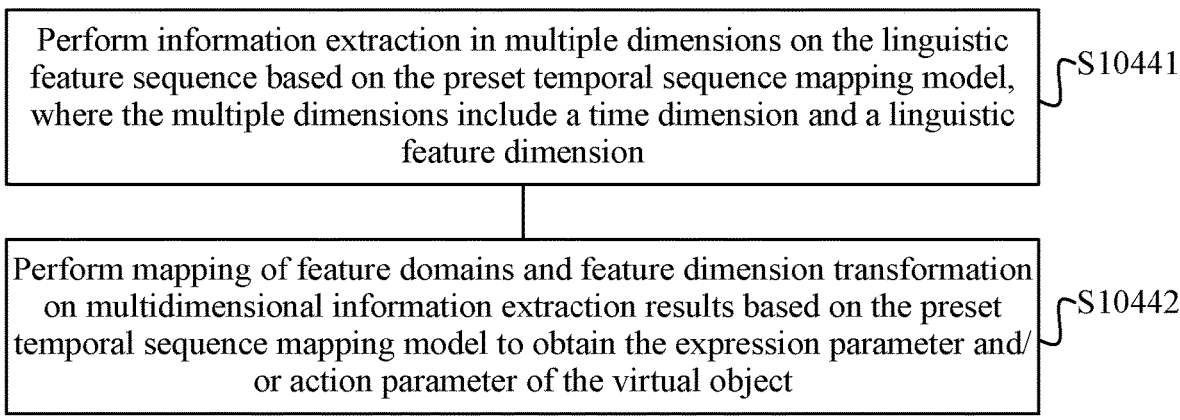
FIG. 4 is a flowchart of an embodiment of step S1044 in FIG. 2.

In a specific implementation, referring to FIG. 4, step S1044 may include the steps described below.

In step S10441, information extraction in multiple dimensions is performed on the linguistic feature sequence based on the preset temporal sequence mapping model, where the multiple dimensions include a time dimension and a linguistic feature dimension.

In step S10442, mapping of feature domains and feature dimension transformation are performed on multidimensional information extraction results based on the preset temporal sequence mapping model so as to obtain the expression parameter and/or action parameter of the virtual object.

The mapping of the feature domains refers to the mapping of linguistic feature domain to virtual object animation feature domain, where the virtual object animation feature domain includes an expression feature and/or action feature of the virtual object.

Specifically, since the length of the inputted audio information or text information in step S1041 is not fixed, variable-length sequence information (that is, the linguistic feature sequence) obtained based on the processing on the input information may be processed based on the RNN and its variant (for example, a long short-term memory (LSTM) network) so that the feature information may be extracted from the entirety.

Further, a feature mapping model generally involves the feature domain conversion and feature dimension conversion. For this, the conversion function may be implemented based on a fully connected network (FCN).

Further, the RNN may process the input feature in the time dimension, and to process the feature in more dimensions to extract higher dimensional feature information and thus enhance the generalization capability of the model, the input information may be processed based on a convolutional neural network (CNN) and its variants (for example, the dilated convolution and causal convolution).

Further, the feature mapping model such as the preset temporal sequence mapping model generally involves the feature domain conversion and feature dimension conversion. For this, the conversion function may be implemented based on the FCN.

Further, after the preset temporal sequence mapping model is designed, the model may be trained using pre-prepared training data and machine learning technology so as to find optimal parameters of the preset temporal sequence mapping model, thereby achieving the mapping from a linguistic feature sequence to a virtual object animation sequence.

Further, the preset temporal sequence mapping model may be a model that can use temporal sequence information (for example, the text information and the audio information aligned with time) to make predictions about other temporal sequence information (for example, the virtual object animation).

In a specific implementation, the training data for the preset temporal sequence mapping model may include the text information, speech data synchronized with the text information, and the virtual object animation data.

Specifically, the training data may be the corresponding speech data and action data (the speech is in a one-to-one correspondence with the action) represented by the professional sound recordist (and actor) according to the rich and emotional text information. The action data includes a facial expression action and a body action. The facial expression action involves information such as the expression and eye.

After the correspondence between the facial expression action and a virtual object controller is established, virtual object facial expression controller data is obtained. The body action may be obtained by capturing high-quality gesture information data of the performance of the actor on a performance capture platform, and the body action data has temporal correspondence with expression data. Therefore, the corresponding virtual object animation data may be obtained based on the mapping of a digitized vector sequence (that is, the linguistic feature sequence).

Similar to the logic for driving the facial expression action, the body action may be driven based on the controller. Alternatively, the body action may be driven through the skeleton.

In a specific implementation, the preset temporal sequence mapping model may be convolutional LSTM deep neural networks (CLDNN).

It is to be noted that although in this specific implementation, the preset temporal sequence mapping model consisting of the three networks is used as an example for detailed description, in practical applications, the structure of the preset temporal sequence mapping model may not be limited to this. For example, the preset temporal sequence mapping model may be any one of the three networks and may also be a combination of any two of the three networks.

Specifically, the preset temporal sequence mapping model may include a multilayer convolutional network for receiving the linguistic feature sequence and performing multidimensional information extraction on the linguistic feature sequence.

For example, the multilayer convolutional network may include a four-layer dilated convolutional network for performing the multidimensional information extraction on the quantified linguistic feature sequence obtained through processing in step S1043. The linguistic feature sequence may be 2D data. Assuming that each pronunciation unit is represented by a 600-bit pronunciation feature and 100 pronunciation units exist, the linguistic feature sequence inputted into the preset temporal sequence mapping model is a 2D array of 100×600. The dimension 100 represents the time dimension and the dimension 600 represents the linguistic feature dimension. Correspondingly, the multilayer convolutional network performs feature operations in both the time dimension and the linguistic feature dimension.

Further, the preset temporal sequence mapping model may further include the LSTM network for performing information aggregation processing on the information extraction result in the time dimension. Therefore, features convolved by the multilayer convolutional network may be considered as a whole in terms of continuity in the time dimension.

For example, the LSTM network may include two layers of stacked bidirectional LSTM networks coupled to the multilayer convolutional network so as to obtain the information extraction result of the linguistic feature sequence in the time dimension outputted from the multilayer convolutional network. Further, the two layers of stacked bidirectional LSTM networks perform high-dimensional information processing on the information extraction result of the linguistic feature sequence in the time dimension to further obtain the feature information in the time dimension.

Further, the preset temporal sequence mapping model may further include a deep neural network coupled to the multilayer convolutional network and the LSTM network, where the deep neural network is used for performing the mapping of the feature domains and feature dimension transformation on the multidimensional information extraction results outputted by the multilayer convolutional network and the LSTM network to obtain the expression parameter and/or action parameter of the virtual object.

For example, the deep neural network may receive the information extraction result in the linguistic feature dimension outputted by the multilayer convolutional network, and the deep neural network may also receive the information extraction result in the updated time dimension outputted by the LSTM network.

The dimension transformation may refer to dimension reduction. For example, the preset temporal sequence mapping model has an input of 600 features and an output of 100 features.

For example, the deep neural network may include multiple layers of fully connected layers connected in series, where the first fully connected layer is used for receiving the multidimensional information extraction results and the last fully connected layer outputs the expression parameter and/or action parameter of the virtual object. Three fully connected layers may be provided.

Further, the deep neural network may further include multiple nonlinear transformation modules each of which is coupled between two adjacent fully connected layers other than the last fully connected layer, where the nonlinear transformation module is used for performing nonlinear transformation processing on an output result of the coupled previous fully connected layer and inputting a result of the nonlinear transformation processing into the coupled next fully connected layer.

The nonlinear transformation module may be a rectified linear unit (ReLU) activation function.

The nonlinear transformation module can enhance expressiveness and generalization capabilities of the preset temporal sequence mapping model.

In a varied embodiment, the multilayer convolutional network, the LSTM network, and the deep neural network may be connected in series in sequence, where the information extraction result in the linguistic feature dimension outputted from the multilayer convolutional network is transmitted to the deep neural network through the LSTM network, and the information extraction result in the time dimension outputted from the multilayer convolutional network is processed by the LSTM network and transmitted to the deep neural network.

From the above, in the solution of this embodiment, the multimodal inputs (the audio and text) are used as the original information. First, the original information is converted into a linguistic pronunciation unit and its feature (that is, the linguistic feature) that are not affected by the articulator, the audio feature, and the like; then, the linguistic feature is synchronized with the audio in the time dimension so as to obtain the time-aligned linguistic feature sequence; then, the time-aligned linguistic feature sequence is inputted into the preset temporal sequence mapping model obtained by pre-learning so as to obtain the virtual object animation corresponding to the input information.

The solution of this embodiment does not depend on the drive of the model by a specific pronunciation actor, thereby completely getting rid of the dependence on the specific pronunciation actor, which is conducive to reducing the labor costs in the animation production process.

Further, in the solution of this embodiment, high-quality virtual object animation, especially the 3D animation, can be outputted, and the cost of labor and time of manual trimming of the animation by the animators and artists are reduced, which is conducive to improving the production efficiency of the animation.

Further, in the solution of this embodiment, the capability of receiving different types of input information is provided, thereby increasing the scope of application, which is conducive to further reducing the costs and efficiency associated with animation production.

Further, the traditional end-to-end virtual object animation synthesis technology generates mainly the 2D animation, while in the solution of this embodiment, both of the high-quality 3D animation and 2D animation can be generated.

The "virtual object animation sequence" in the solution of this embodiment is a generalized representation of the quantized animation data or animation controller, not limited to the 2D or 3D animation, depending on a representation manner of the "virtual object animation sequence" in the training data used by the preset temporal sequence mapping model in learning the optimal parameters. After a virtual object animation controller is obtained, the virtual object animation sequence may be converted into the corresponding video animation through Maya, UE, and other software.

From the above, the virtual object animation, especially the 3D animation, with emotional speech can be quickly and efficiently generated from the text, which has high versatility and does not need the drive of a specific voice actor. Specifically, the emotional speech is synthesized by analyzing the emotional feature and the rhyme boundary of the text. Further, the corresponding virtual object animation is generated based on the text and the emotional speech. Further, data of the generated virtual object animation in the temporal sequence is synchronized in time with the audio information, making it possible to generate the virtual object animation directly from the text, and the generated virtual object animation can be synchronized with the emotional speech when acting in the temporal sequence.

Figure 5:
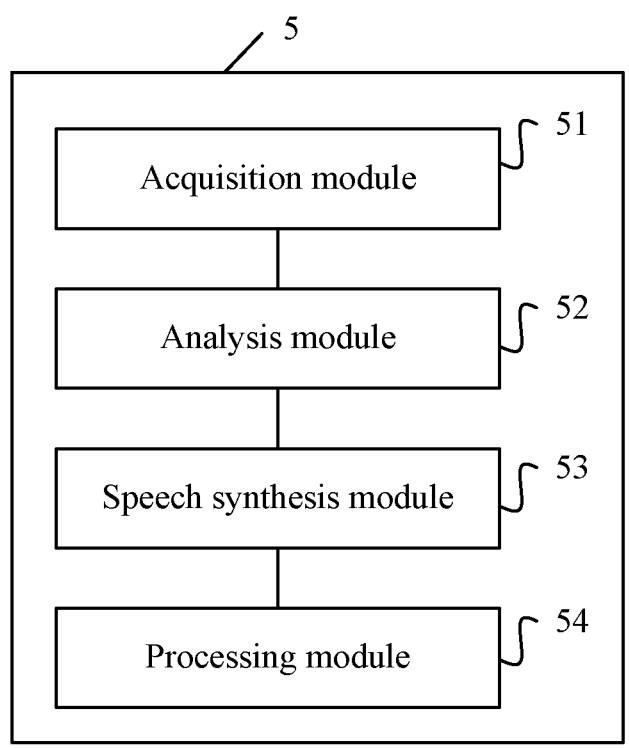
FIG. 5 is a structural diagram of a text-based virtual object animation generation apparatus according to an embodiment of the present disclosure.

FIG. 5 is a structural diagram of a text-based virtual object animation generation apparatus according to an embodiment of the present disclosure. It is to be understood by those skilled in the art that a text-based virtual object animation generation apparatus 5 in this embodiment may be configured to implement the technical solution of the method described in any of the preceding embodiments in FIGS. 1 to 4.

Specifically, referring to FIG. 5, the text-based virtual object animation generation apparatus 5 in this embodiment may include an acquisition module 51, an analysis module 52, a speech synthesis module 53, and a processing module 54. The acquisition module 51 is configured to acquire text information, where the text information includes an original text of a virtual object animation to be generated. The analysis module 52 is configured to analyze an emotional feature and a rhyme boundary of the text information. The speech synthesis module 53 is configured to perform speech synthesis according to the emotional feature, the rhyme boundary, and the text information to obtain audio information, where the audio information includes emotional speech obtained by conversion based on the original text. The processing module 54 is configured to generate a corresponding virtual object animation based on the text information and the audio information, where the virtual object animation is synchronized in time with the audio information.

For more details about the working principle and manner of the text-based virtual object animation generation apparatus 5, reference may be made to the related descriptions in FIGS. 1 to 4. The details are not repeated here.

In an exemplary application scenario, the text-based virtual object animation generation method in this embodiment may be performed by a text-based virtual object animation generation method system.

Specifically, the text-based virtual object animation generation method system may include a collection module for collecting the text information, the acquisition module 51 in the text-based virtual object animation generation apparatus 5 shown in FIG. 5 is coupled to the collection module to receive the text information, and the text-based virtual object animation generation apparatus 5 performs the text-based virtual object animation generation method shown in FIGS. 1 to 4 to generate the corresponding virtual object animation and emotional speech.

Further, the collection module may be a text input device such as a keyboard for collecting the text information.

Further, the text-based virtual object animation generation apparatus 5 may be integrated in a computing device such as a terminal or a server. For example, text-based virtual object animation generation apparatuses 5 may be centrally integrated in the same server. Alternatively, the text-based virtual object animation generation apparatuses 5 may be separately integrated in different terminals or servers and coupled with each other. For example, the preset temporal sequence mapping model may be set on a separate terminal or server, so as to ensure a better data processing speed.

Based on the text-based virtual object animation generation system in this embodiment, the user provides the input information at the collection module to obtain the corresponding virtual object animation and the emotional speech synchronized with the virtual object animation at the text-based virtual object animation generation apparatus 5.

Further, an embodiment of the present disclosure further discloses a storage medium, which is configured to store computer programs, where when executed by a processor, the computer programs cause the processor to perform the technical solution of the method in the embodiments shown in FIGS. 1 to 4. Preferably, the storage medium may include a computer readable storage medium such as a non-volatile memory or a non-transitory memory. The storage medium may include a read-only memory (ROM), a random-access memory (RAM), a magnetic disk, or a compact disc (CD), and the like.

Further, an embodiment of the present disclosure further discloses a terminal including a memory and a processor, where the memory stores a computer program capable of running on the processor, and the processor, when executing the computer program, performs the technical solution of the method in the embodiments shown in FIGS. 1 to 4.

Optionally, the step of analyzing the emotional feature and the rhyme boundary of the text information includes performing word segmenting processing on the text information; performing an emotion analysis on each word obtained by the word segmenting to obtain the emotional feature of the each word; and determining the rhyme boundary of the each word.

Optionally, the step of analyzing the emotional feature and the rhyme boundary of the text information includes analyzing the emotional feature of the text information based on a preset text front-end prediction model, where an input of the preset text front-end prediction model is the text information, and an output of the preset text front-end prediction model is the emotional feature, the rhyme boundary, and the word segmenting of the text information.

Optionally, the step of performing the speech synthesis based on the emotional feature, the rhyme boundary, and the text information to obtain the audio information includes inputting the text information, the emotional feature, and the rhyme boundary into a preset speech synthesis model, where the preset speech synthesis model is used for converting an inputted text sequence into a speech sequence in a temporal sequence, and speech in the speech sequence carries emotion of the text at a corresponding point in time; and acquiring the audio information outputted by the preset speech synthesis model.

Optionally, the preset speech synthesis model is trained based on training data, where the training data includes a text information sample and a corresponding audio information sample, where the audio information sample is pre-recorded according to the text information sample.

Optionally, the training data further includes an extended sample, where the extended sample is obtained by performing audio text slicing recombination on the text information sample and the corresponding audio information sample.

Optionally, the step of generating the corresponding virtual object animation based on the text information and the audio information includes receiving input information, where the input information includes the text information and the audio information; converting the input information into a pronunciation unit sequence; performing a feature analysis on the pronunciation unit sequence to obtain a corresponding linguistic feature sequence; and inputting the linguistic feature sequence into a preset temporal sequence mapping model to generate the corresponding virtual object animation based on the linguistic feature sequence.

Optionally, the step of generating the corresponding virtual object animation based on the text information and the audio information includes inputting the text information and the audio information into a preset temporal sequence mapping model to generate the corresponding virtual object animation.

Optionally, the preset temporal sequence mapping model is used for mapping the inputted feature sequence to an expression parameter and/or action parameter of a virtual object in a temporal sequence to generate the corresponding virtual object animation.

Optionally, after the text information is acquired and before the emotional feature and the rhyme boundary of the text information are analyzed, the virtual object animation generation method further includes normalizing the text information according to a contextual background to obtain the normalized text information.

Optionally, the normalization processing includes numeric reading processing and special character reading processing.

Optionally, the step of generating the corresponding virtual object animation based on the text information and the audio information includes generating the corresponding virtual object animation based on the text information, the emotional feature and the rhyme boundary of the text information, and the audio information.

To solve the preceding technical problem, an embodiment of the present disclosure further provides a text-based virtual object animation generation apparatus. The apparatus includes an acquisition module, an analysis module, a speech synthesis module, and a processing module. The acquisition module is configured to acquire text information, where the text information includes an original text of a virtual object animation to be generated. The analysis module is configured to analyze an emotional feature and a rhyme boundary of the text information. The speech synthesis module is configured to perform speech synthesis according to the emotional feature, the rhyme boundary, and the text information to obtain audio information, where the audio information includes emotional speech obtained by conversion based on the original text. The processing module is configured to generate a corresponding virtual object animation based on the text information and the audio information, where the virtual object animation is synchronized in time with the audio information.

To solve the preceding technical problem, an embodiment of the present disclosure further provides a storage medium configured to store computer programs, where when executed by a processor, the computer programs cause the processor to perform the step of the method.

To solve the preceding technical problem, an embodiment of the present disclosure further provides a terminal including a memory and a processor, where the memory stores a computer program capable of running on the processor, and the processor, when executing the computer program, performs the step of the method.

Compared with the existing art, the technical solution of embodiments of the present disclosure has the beneficial effects described below.

An embodiment of the present disclosure provides a text-based virtual object animation generation method. The method includes acquiring text information, where the text information includes an original text of a virtual object animation to be generated; analyzing an emotional feature and a rhyme boundary of the text information; performing speech synthesis according to the emotional feature, the rhyme boundary, and the text information to obtain audio information, where the audio information includes emotional speech obtained by conversion based on the original text; and generating a corresponding virtual object animation based on the text information and the audio information, where the virtual object animation is synchronized in time with the audio information.

Compared to the existing technical solution that the drive of the generation of the virtual object animation must rely on a specific audio feature of a voice actor, in the solution, the virtual object animation, especially a three-dimensional (3D) animation, with emotional speech can be quickly and efficiently generated from the text, which has high versatility and does not need the drive of the specific voice actor. Specifically, the emotional speech is synthesized by analyzing the emotional feature and the rhyme boundary of the text. Further, the corresponding virtual object animation is generated based on the text and the emotional speech. Further, data of the generated virtual object animation in the temporal sequence is synchronized in time with the audio information, making it possible to generate the virtual object animation directly from the text, and the generated virtual object animation can be synchronized with the emotional speech when acting in the temporal sequence.

Further, the step of generating the corresponding virtual object animation based on the text information and the audio information includes receiving input information, where the input information includes the text information and the audio information; converting the input information into a pronunciation unit sequence; performing a feature analysis on the pronunciation unit sequence to obtain a corresponding linguistic feature sequence; and inputting the linguistic feature sequence into a preset temporal sequence mapping model to generate the corresponding virtual object animation based on the linguistic feature sequence.

In the solution, the corresponding linguistic feature sequence in the original audio or text is extracted and used as the input information of the preset temporal sequence mapping model. Since the linguistic feature is related to only semantic content of the audio and not related to timbre, pitch, fundamental frequency F0 features, and other features that vary by an articulator. Therefore, the solution of this embodiment is not limited to a specific articulator, and the original audio with different audio features can be applied to the preset temporal sequence mapping model described in this embodiment. That is to say, since in the solution of this embodiment, the audio feature in the audio information is not analyzed, but the linguistic feature of the pronunciation unit is analyzed after the audio information is converted into the pronunciation unit, making it possible to generate the virtual object animation without relying on the drive of a neural network model by the specific audio feature. Therefore, the end-to-end virtual object animation generation method provided by the solution of this embodiment can be applied to the end-to-end virtual object animation generation of any voice actor and any text, solving the dependence on the specific voice actor in the existing end-to-end automated audio synthesis virtual object animation technology and truly achieving the "versatility" of the technology.

Further, the preset temporal sequence mapping model is trained and constructed based on the deep learning technology, and then the inputted linguistic feature sequence is mapped to the expression parameter and/or action parameter of the corresponding virtual object based on the preset temporal sequence mapping model. The animation generation process does not need the participation of animators and artists and completely relies on the automatic calculation of the computer, thereby greatly reducing the cost of labor and time and truly achieving the end-to-end automated virtual object animation synthesis technology.

Further, the originally received input information may be the text information or the audio information so that in the solution of this embodiment, the corresponding virtual object animation can be generated according to different input modalities.

Although the present disclosure is disclosed as above, the present disclosure is not limited thereto. Those skilled in the art may make various changes and modifications without departing from the spirit and scope of the present disclosure. Therefore, the scope of the present disclosure shall be subject to the scope defined by the claims.

What is claimed is:

1. A text-based virtual object animation generation method, comprising:
    acquiring text information, wherein the text information comprises an original text of a virtual object animation to be generated;
    analyzing an emotional feature and a rhyme boundary of the text information;
    performing speech synthesis according to the emotional feature, the rhyme boundary, and the text information to obtain audio information, wherein the audio information comprises emotional speech obtained by conversion based on the original text; and
    generating a corresponding virtual object animation based on the text information and the audio information, wherein the virtual object animation is synchronized in time with the audio information;
    wherein generating the corresponding virtual object animation based on the text information and the audio information comprises:
    receiving input information, wherein the input information comprises the text information and the audio information;
    converting the audio information into pronunciation units and time codes based on speech recognition technology and a preset pronunciation dictionary, wherein the text information is used for determining a duration of each piece of speech in the audio information; and
    performing a time alignment operation on the pronunciation units according to the time codes so as to obtain a time-aligned pronunciation unit sequence;
    performing a feature analysis on the time-aligned pronunciation unit sequence to obtain a corresponding linguistic feature sequence; and
    inputting the linguistic feature sequence into a preset temporal sequence mapping model to generate the corresponding virtual object animation based on the linguistic feature sequence;
    wherein performing the speech synthesis based on the emotional feature, the rhyme boundary, and the text information to obtain the audio information comprises:
    inputting the text information, the emotional feature, and the rhyme boundary into a preset speech synthesis model, wherein the preset speech synthesis model is used for converting an inputted text sequence into a speech sequence in a temporal sequence, and speech in the speech sequence carries emotion of the text at a corresponding point in time; and
    acquiring the audio information outputted by the preset speech synthesis model.

2. The virtual object animation generation method of claim 1, wherein analyzing the emotional feature and the rhyme boundary of the text information comprises:
    performing word segmenting processing on the text information;
    performing an emotion analysis on each word obtained by the word segmenting to obtain the emotional feature of the each word; and
    determining the rhyme boundary of the each word.

3. The virtual object animation generation method of claim 2, wherein analyzing the emotional feature and the rhyme boundary of the text information comprises:
    analyzing the emotional feature of the text information based on a preset text front-end prediction model, wherein an input of the preset text front-end prediction model is the text information, and an output of the preset text front-end prediction model is the emotional feature, the rhyme boundary, and the word segmenting of the text information.

4. The virtual object animation generation method of claim 1, wherein analyzing the emotional feature and the rhyme boundary of the text information comprises:
    analyzing the emotional feature of the text information based on a preset text front-end prediction model, wherein an input of the preset text front-end prediction model is the text information, and an output of the preset text front-end prediction model is the emotional feature, the rhyme boundary, and the word segmenting of the text information.

5. The virtual object animation generation method of claim 1, wherein the preset speech synthesis model is trained based on training data, wherein the training data comprises a text information sample and a corresponding audio information sample, wherein the audio information sample is pre-recorded according to the text information sample.

6. The virtual object animation generation method of claim 5, wherein the training data further comprises an extended sample, wherein the extended sample is obtained by performing audio text slicing recombination on the text information sample and the corresponding audio information sample.

7. The virtual object animation generation method of claim 1, wherein generating the corresponding virtual object animation based on the text information and the audio information comprises:
    inputting the text information and the audio information into a preset temporal sequence mapping model to generate the corresponding virtual object animation.

8. The virtual object animation generation method of claim 7, wherein the preset temporal sequence mapping model is used for mapping the inputted feature sequence to at least one of an expression parameter or an action parameter of a virtual object in a temporal sequence to generate the corresponding virtual object animation.

9. The virtual object animation generation method of claim 1, wherein the preset temporal sequence mapping model is used for mapping the inputted feature sequence to at least one of an expression parameter or an action parameter of a virtual object in a temporal sequence to generate the corresponding virtual object animation.

10. The virtual object animation generation method of claim 1, wherein after the text information is acquired and before the emotional feature and the rhyme boundary of the text information are analyzed, the method further comprises:
    normalizing the text information according to a contextual background to obtain the normalized text information.

11. The virtual object animation generation method of claim 10, wherein the normalization processing comprises numeric reading processing and special character reading processing.

12. The virtual object animation generation method of claim 1, wherein generating the corresponding virtual object animation based on the text information and the audio information comprises:
  generating the corresponding virtual object animation based on the text information, the emotional feature and the rhyme boundary of the text information, and the audio information.

13. A non-transitory storage medium, which is configured to store computer programs, wherein when executed by a processor, the computer programs cause the processor to perform the following steps:
  acquiring text information, wherein the text information comprises an original text of a virtual object animation to be generated;
  analyzing an emotional feature and a rhyme boundary of the text information;
  performing speech synthesis according to the emotional feature, the rhyme boundary, and the text information to obtain audio information, wherein the audio information comprises emotional speech obtained by conversion based on the original text; and
  generating a corresponding virtual object animation based on the text information and the audio information, wherein the virtual object animation is synchronized in time with the audio information;
  wherein generating the corresponding virtual object animation based on the text information and the audio information comprises:
  receiving input information, wherein the input information comprises the text information and the audio information;
  converting the audio information into pronunciation units and time codes based on speech recognition technology and a preset pronunciation dictionary, wherein the text information is used for determining a duration of each piece of speech in the audio information; and
  performing a time alignment operation on the pronunciation units according to the time codes so as to obtain a time-aligned pronunciation unit sequence;
  performing a feature analysis on the time-aligned pronunciation unit sequence to obtain a corresponding linguistic feature sequence; and
  inputting the linguistic feature sequence into a preset temporal sequence mapping model to generate the corresponding virtual object animation based on the linguistic feature sequence;
  wherein performing the speech synthesis based on the emotional feature, the rhyme boundary, and the text information to obtain the audio information comprises:
  inputting the text information, the emotional feature, and the rhyme boundary into a preset speech synthesis model, wherein the preset speech synthesis model is used for converting an inputted text sequence into a speech sequence in a temporal sequence, and speech in the speech sequence carries emotion of the text at a corresponding point in time; and
  acquiring the audio information outputted by the preset speech synthesis model.

14. A terminal, comprising a memory and a processor, wherein the memory stores a computer program capable of running on the processor, and the processor, when executing the computer program, performs the following steps:
  acquiring text information, wherein the text information comprises an original text of a virtual object animation to be generated;
  analyzing an emotional feature and a rhyme boundary of the text information;
  performing speech synthesis according to the emotional feature, the rhyme boundary, and the text information to obtain audio information, wherein the audio information comprises emotional speech obtained by conversion based on the original text; and
  generating a corresponding virtual object animation based on the text information and the audio information, wherein the virtual object animation is synchronized in time with the audio information;
  wherein generating the corresponding virtual object animation based on the text information and the audio information comprises:
  receiving input information, wherein the input information comprises the text information and the audio information;
  converting the audio information into pronunciation units and time codes based on speech recognition technology and a preset pronunciation dictionary, wherein the text information is used for determining a duration of each piece of speech in the audio information; and
  performing a time alignment operation on the pronunciation units according to the time codes so as to obtain a time-aligned pronunciation unit sequence;
  performing a feature analysis on the time-aligned pronunciation unit sequence to obtain a corresponding linguistic feature sequence; and
  inputting the linguistic feature sequence into a preset temporal sequence mapping model to generate the corresponding virtual object animation based on the linguistic feature sequence;
  wherein performing the speech synthesis based on the emotional feature, the rhyme boundary, and the text information to obtain the audio information comprises:
  inputting the text information, the emotional feature, and the rhyme boundary into a preset speech synthesis model, wherein the preset speech synthesis model is used for converting an inputted text sequence into a speech sequence in a temporal sequence, and speech in the speech sequence carries emotion of the text at a corresponding point in time; and
  acquiring the audio information outputted by the preset speech synthesis model.

15. The terminal of claim 14, wherein analyzing the emotional feature and the rhyme boundary of the text information comprises:
  performing word segmenting processing on the text information;
  performing an emotion analysis on each word obtained by the word segmenting to obtain the emotional feature of the each word; and
  determining the rhyme boundary of the each word.

16. The terminal of claim 14, wherein analyzing the emotional feature and the rhyme boundary of the text information comprises:
  analyzing the emotional feature of the text information based on a preset text front-end prediction model, wherein an input of the preset text front-end prediction model is the text information, and an output of the preset text front-end prediction model is the emotional feature, the rhyme boundary, and the word segmenting of the text information.

17. The terminal of claim 14, wherein the preset speech synthesis model is trained based on training data, wherein the training data comprises a text information sample and a corresponding audio information sample, wherein the audio information sample is pre-recorded according to the text information sample.

\* \* \* \* \*